United States Patent
Yeh

(10) Patent No.: US 10,706,225 B2
(45) Date of Patent: Jul. 7, 2020

(54) FORM MANAGEMENT SYSTEM AND METHOD

(71) Applicant: Chen-Chung Yeh, Taipei (TW)

(72) Inventor: Chen-Chung Yeh, Taipei (TW)

(*) Notice: Subject to any disclaimer, the term of this patent is extended or adjusted under 35 U.S.C. 154(b) by 4 days.

(21) Appl. No.: 15/398,085

(22) Filed: Jan. 4, 2017

(65) Prior Publication Data

US 2017/0199858 A1    Jul. 13, 2017

(30) Foreign Application Priority Data

Jan. 7, 2016 (TW) .............................. 105100412 A

(51) Int. Cl.
G06F 40/106 (2020.01)
G06F 40/174 (2020.01)
G06F 21/62 (2013.01)

(52) U.S. Cl.
CPC ........ *G06F 40/174* (2020.01); *G06F 21/6218* (2013.01); *G06F 40/106* (2020.01)

(58) Field of Classification Search
CPC .............................. G06F 17/212; G06F 17/243
See application file for complete search history.

(56) References Cited

U.S. PATENT DOCUMENTS

| | | | | |
|---|---|---|---|---|
| 5,228,100 A * | 7/1993 | Takeda | ................... | G06F 40/174 382/175 |
| 5,625,465 A * | 4/1997 | Lech | ..................... | G06K 9/2054 358/403 |
| 7,941,743 B2 * | 5/2011 | Reddy | ................. | G03G 15/5087 715/221 |
| 8,213,717 B2 * | 7/2012 | Konno | ................ | G06K 9/00449 382/137 |
| 8,520,889 B2 * | 8/2013 | Navon | ................ | G06K 9/00449 382/100 |
| 8,627,192 B2 * | 1/2014 | Lanahan | ................ | G06F 40/103 715/204 |
| 8,918,729 B2 * | 12/2014 | Fortini | ..................... | G06F 40/14 715/760 |
| 9,047,265 B2 * | 6/2015 | Hagisawa | ............. | G06F 40/174 |
| 2001/0054046 A1 * | 12/2001 | Mikhailov | ............ | G06F 17/243 715/221 |
| 2007/0050701 A1 * | 3/2007 | El Emam | .............. | G06F 17/243 715/201 |
| 2009/0059271 A1 * | 3/2009 | Henry | ................ | H04N 1/32069 358/1.15 |

(Continued)

OTHER PUBLICATIONS

Data bound controls, Feb. 20, 2005, pp. 1-34 https://docs.microsoft.com/en-us/aspnet/web-forms/overview/moving-to-aspnet-20/data-bound-controls.*

(Continued)

*Primary Examiner* — Scott T Baderman
*Assistant Examiner* — Mario M Velez-Lopez
(74) *Attorney, Agent, or Firm* — Muncy, Geissler, Olds & Lowe, P.C.

(57) ABSTRACT

The present invention provides a form management system, comprising: a form building module, the form building module calling a word processing application software to obtain layout information of a form; and a common library building module, the common library building module building a correlation between a specific field of the form and default data of the specific field and storing the correlation in a common library.

14 Claims, 3 Drawing Sheets

(56) References Cited

U.S. PATENT DOCUMENTS

| | | | |
|---|---|---|---|
| 2010/0070486 A1* | 3/2010 | Punaganti Venkata ....................... | G06F 16/972 707/722 |
| 2010/0138239 A1* | 6/2010 | Reicher ................. | G06F 17/243 705/3 |
| 2011/0246452 A1* | 10/2011 | Johnston ................ | G06Q 30/06 707/722 |
| 2013/0219451 A1* | 8/2013 | Chaudhury ............. | G06F 21/60 726/1 |
| 2014/0108043 A1* | 4/2014 | Ach ....................... | G06Q 10/10 705/3 |
| 2015/0106211 A1 | 4/2015 | Khalil | |
| 2016/0308954 A1* | 10/2016 | Wilbur ................... | H04L 67/10 |

OTHER PUBLICATIONS

"Data Bound Controls," Microsoft, Feb. 20, 2005, retrieved from https://docs.microsoft.com/en-us/aspnet/web-forms/overview/nnoving-to-aspnet-20/data-bound-controls, pp. 1-39.

* cited by examiner

FORM MANAGEMENT SYSTEM AND METHOD

BACKGROUND

The present invention relates to management of electronic forms. More particularly, the present invention relates to systems and methods for building forms and collecting data.

Along with the developments in the Internet and cloud technologies, electronic forms are becoming more and more popular. The use of electronic forms can accelerate internal approval workflow and enhance the overall corporate efficiency, thereby eliminating the low efficiency problem found in traditional approval processes. Therefore, many companies now use electronic forms for internal procedures.

Along with the diversity and complexity of the forms used by companies, when an existing electronic form does not meet corporate needs and new form specifications are needed, it is common to have a system engineer or programmer modify the program for that form or build a new form and then upload the modified or new electronic form to the form system for use by users. This practice is time-consuming and impacts the efficiency in processing forms. This is especially true if multiple new forms have to be built at the same time, or if the fields and layouts of multiple existing forms have to be modified. This is because a considerable amount of time is required to complete the programming work, thereby adversely affecting the efficiency in updating electronic forms.

Programming is currently a common way to create electronic forms, and this has to be done by professional programmers. Moreover, it requires a lot of training costs and form management time.

If a customized mechanism can be provided to allow administrators to use familiar word processing application software to build a desired form and then set the approval workflow via the form system and finalize the electronic form, then the system engineer or programmer will not have to modify the form, thus considerably reducing the time for form management.

Therefore, how to reduce the time required for managing forms has become a very important issue for software developers.

SUMMARY

The present invention provides a form management system, comprising: a form building module, the form building module calling a word processing application software to obtain layout information of a form; and a common library building module, the common library building module building a correlation between a specific field of the form and default data of the specific field and storing the correlation in a common library.

The present invention provides a form management method, comprising: calling a word processing application software to obtain layout information of a form; and building a correlation between a specific field of the form and default data of the specific field and storing the correlation in a common library.

According to the form management system and method provided by the present invention, an administrator can first use familiar word processing application software to edit and generate the desired form and preview the form on the form management system to confirm whether the form is displayed as expected; then the administrator can set the approval workflow via the form management system and finalize the electronic form. Thus, even if the administrator is not a professional programmer, he can manage the forms he desires using the form management system and method provided by the present invention.

In addition, according to the form management system and method provided by the present invention, when an administrator designs a new form or updates a field in an existing form, he can select existing data from the common library and bind the data with the field. As a result, the administrator does not have to rewrite the program to specify the data available for the field, thereby significantly reducing the time for form development.

The aforementioned and other advantages and features of the present invention will be more apparent from the descriptions, embodiments, and claims set forth below.

DETAILED DESCRIPTION

The present invention provides a form management system and method. The technical details, features, and effects of the present invention will be further explained below with reference to various embodiments and drawings.

The present invention provides a form management and form data collection platform that can use the cloud technology. With the platform, administrators can quickly set up and maintain form layouts, form objects, common libraries, and form permissions and can immediately publish the latest version of the forms to authorized form users to collect information.

The cloud technology allows computers and applications to be remotely operated and accessed via the Internet. Under the cloud technology, a virtual machine is executed in a large data center and replaces physical computers and servers. By putting the computation needs of many users into a single data center, the cloud technology can produce significant effects such as less power consumption, easier installation and maintenance, and more convenience for capacity and performance upgrades.

Figure 1:
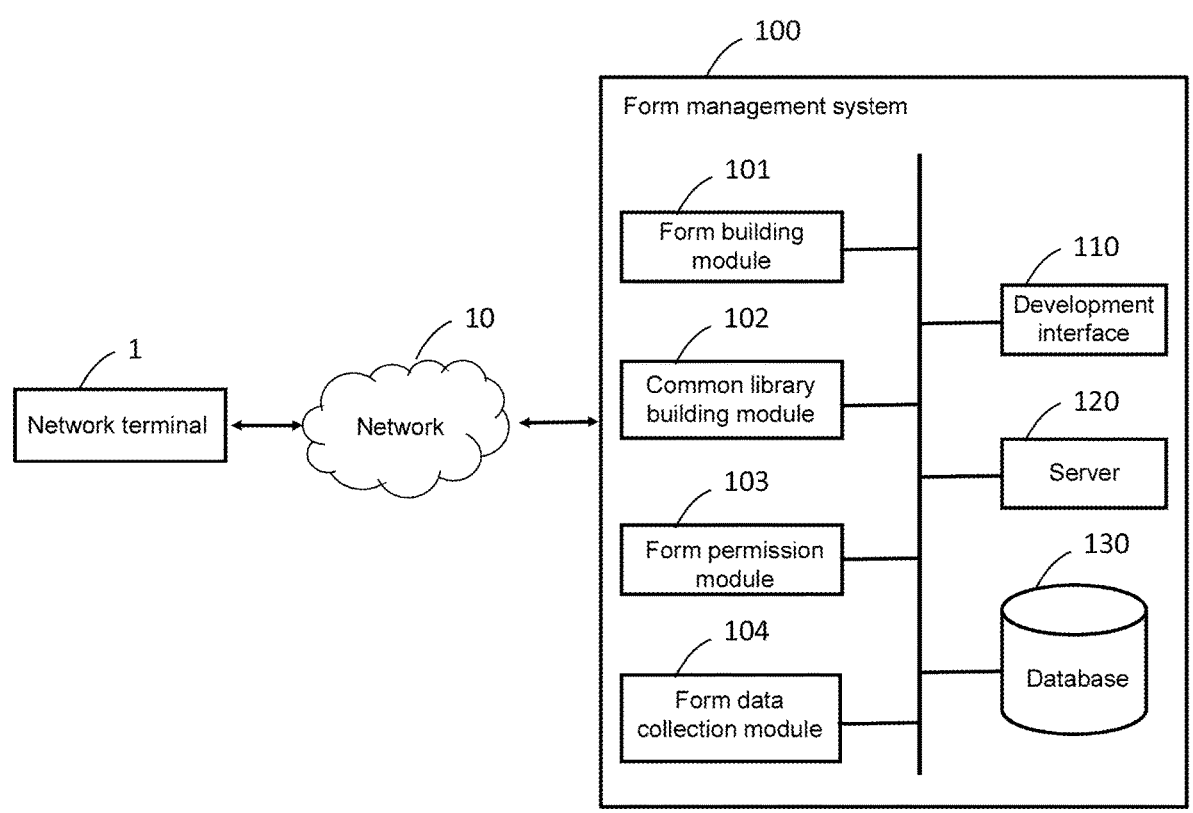
FIG. 1 is a block diagram showing a form management system in accordance with some embodiments of the present invention.

FIG. 1 shows a form management system in accordance with the present invention. In some embodiments, the administrator may use a network terminal 1 (such as a personal computer, a laptop, or a mobile device) to connect to a form management system 100 via a network 10. In some embodiments, the administrator may directly use the form management system 100 without a network 10.

In some embodiments, the form management system 100 comprises a form building module 101, a common library building module 102, a form permission module 103, a form data collection module 104, and a development interface 110.

In some embodiments, the form building module 101 may call a word processing application software to obtain layout information of a form. The word processing application software may be, for example, Microsoft Word.

In some embodiments, the administrator may first use the word processing application software to edit and generate the desired form and then set the required fields of the form and a form object corresponding to each required field via a data-bound control. The data-bound control may be, for example, Microsoft Word bookmarks. Finally, the finalized form is uploaded to the form management system 100.

In some embodiments, the form management system 100 may display the fields and layout of the form and the corresponding form object for each field in the development interface 110.

In some embodiments, the administrator may set control attributes corresponding to the form object via the development interface 110, the control attributes comprising at least one of: element type, size, maximum length, default value, and data format. In some embodiments, the element type may be, for example, a text box, a check box, or a dropdown list.

In some embodiments, when the administrator selects a specific field in the development interface 110, the developer interface 110 may display the control attributes of the form object corresponding to the specific field so that the administrator may set the control attributes.

In some embodiments, the form building module 101 may provide a preview mode via the development interface 110 so that the administrator may preview the form to confirm whether it is displayed as expected.

In some embodiments, the common library building module 102 may build a correlation between a specific field of the form and default data of the specific field and store the correlation in a common library 105 (not shown). In some embodiments, the common library 105 may be stored in a database 130.

In some embodiments, when the administrator sets the element type for a specific field in the development interface 110, the common library building module 102 may search existing default data in the common library 105 and display in the development interface 110 the default data associated with the specific field. In some embodiments, the administrator may also search the default data associated with the specific field in the common library 105 via the development interface 110.

In some embodiments, the administrator may add first default data associated with the specific field via the development interface 110 and store a first correlation between the specific field and the first default data in the common library 105. In some embodiments, the administrator may also update the first default data stored in the common library 105 via the development interface 110.

In some embodiments, the administrator may select a specific default data from the common library 105 and bind the specific default data with the specific field. In some embodiments, the specific default data may be selected from all default data associated with the specific field in the common library 105. As a result, the administrator does not have to rewrite the program to specify the default data available for the specific field, thereby significantly reducing the time for form development.

In some embodiments, an administrator of another form may select first default data from the common library 105 and bind the first default data with a first field in the other form. In some embodiments, the first default data may be selected from all default data associated with the first field in the common library 105. That is, the correlations between fields and default data stored in the common library 105 may be concurrently used by multiple forms. With the help of the common library mechanism, administrators will no longer have to waste time on writing programs to set the default data of the fields, making the development and maintenance of forms more flexible.

In some embodiments, the form building module 101 may also enable the administrator to set at least one of the following for the form: approval level, approval workflow, and permission rules. In some embodiments, the administrator may set the approval levels of the form via the development interface 110. For example, the administrator may set that the form must pass a predefined number of approval levels. In some embodiments, the administrator may set the approval workflow of the form via the development interface 110. That is, the administrator may set the order of persons (such as a chairman) for approving the form. In some embodiments, the administrator may set the permission rules via the development interface 110. For example, the administrator may set the form to only be viewed by specific person(s). In some embodiments, the aforementioned settings may be stored in the database 130 via the form building module 101. As a result, the administrator may directly apply existing settings when building a form.

In some embodiments, the form permission module 103 may set access permissions for the form. The administrator may publish the finalized form via the form permission module 103 and enable authorized form users to access the form and enter data. In some embodiments, the administrator may designate which form users can access the form via the development interface 110. Authorized form users may use the network terminal 1 to log into the form management system 100 via the network 10. A form user may log into his account by entering his password. After a user logs into the form management system 100, the form management system 100 may display all forms accessible by the form user. After selecting one form, the form user may enter data in the fields of the form.

In some embodiments, the form data collection module 104 may export the form with entered data to a file having other data presentation formats and may convert the entered data into other data storage formats for data exchange with other systems. In some embodiments, the exported file may be, for example, a Portable Document Format (PDF) file. In some embodiments, the entered data may be converted into a data storage format such as eXtensible Markup Language (XML).

In some embodiments, the form management system 100 may also comprise a server 120 and a database 130. The server 120 may provide development environments for electronic forms, such as the ASP.NET development environment. The server 120 may also enable form users to access the forms. In some embodiments, the database 130 may store a variety of electronic forms. The database 130 may also store various system settings of the form management system 100.

Figure 2:
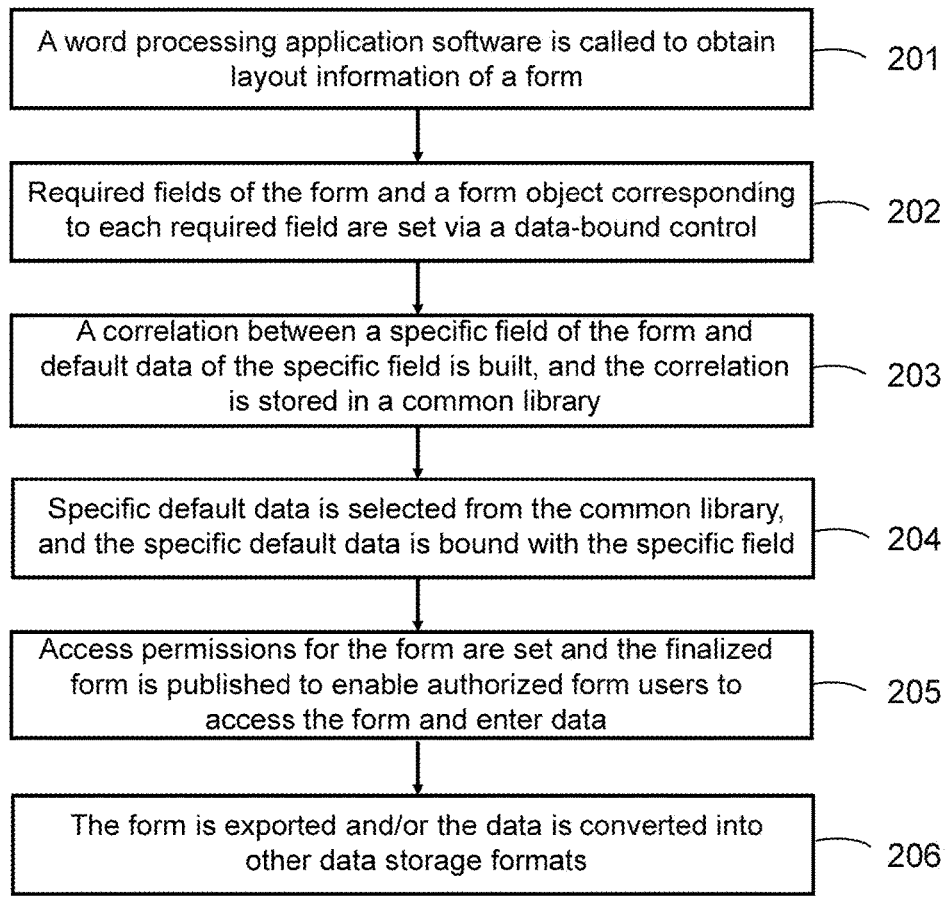
FIG. 2 is a flow diagram showing a form management method in accordance with some embodiments of the present invention.

FIG. 2 shows a method of creating a form in accordance with the present invention. In step 201, a word processing application software is called to obtain layout information of a form. The word processing application software may be, for example, Microsoft Word.

In step 202, required fields of the form and a form object corresponding to each required field are set via a data-bound control. The data-bound control may be, for example, Microsoft Word bookmarks.

In step 203, a correlation between a specific field of the form and default data of the specific field is built, and the correlation is stored in a common library. In some embodiments, the common library may be stored in the database 130 of FIG. 1.

In step 204, specific default data is selected from the common library, and the specific default data is bound with the specific field.

In step 205, access permissions for the form are set and the finalized form is published to enable authorized form users to access the form and enter data.

In step 206, the form with entered data is exported to a file having other data presentation formats, and/or the entered data is converted into other data storage formats for data exchange with other systems. In some embodiments, the exported file may be, for example, a PDF file. In some embodiments, the input data may be converted into a data storage format such as XML.

Figure 3:
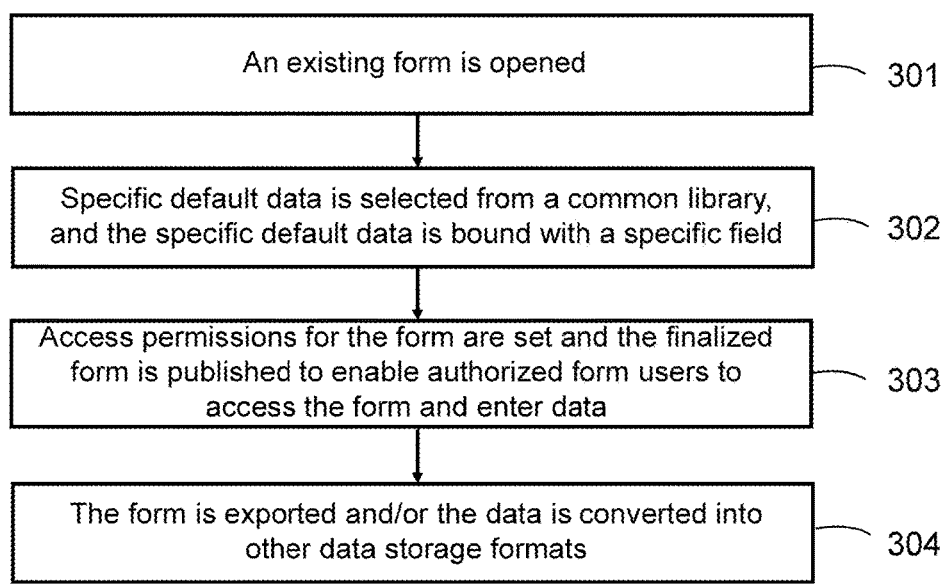
FIG. 3 is a flow diagram showing a form management method in accordance with some embodiments of the present invention.

FIG. 3 shows a method of updating an existing form in accordance with the present invention. In step 301, an existing form is opened.

In step 302, specific default data is selected from a common library, and the specific default data is bound with a specific field. In some embodiments, the specific default data may be selected from all default data associated with the specific field in the common library.

In step 303, access permissions for the form are set and the completed form is published to enable authorized form users to access the form and enter data.

In step 304, the form with entered data is exported to a file having other data presentation formats, and/or the entered data is converted into other data storage formats for data exchange with other systems. In some embodiments, the exported file may be, for example, a PDF file. In some embodiments, the input data may be converted into a data storage format such as XML.

It should be noted that the aforementioned embodiments merely exemplarily illustrate the principles and effects of the present invention and are not intended to limit the scope of the present invention. Persons skilled in the art can modify and alter the aforementioned embodiments without departing from the technical principles and spirit of the present invention.

What is claimed is:

1. A non-transitory computer-readable storage medium comprising computer-readable instructions that, when executed by one or more processors, cause the one or more processors to perform:
calling a word processing application software to obtain layout information of a paper form;
building a correlation between a specific field of an electronic form and default data of the specific field and storing the correlation in a common library, wherein an electronic form developer sets a element type for the specific field, and when the element type for the specific field is set, existing default data associated with the specific field in the common library is searched and displayed in a development interface to the electronic form developer;
converting the layout information of the paper form into the electronic form, wherein the electronic form is a form in an electronic application;
setting required fields of the electronic form and an electronic form object corresponding to each required field via a data-bound control of the word processing application software;
setting access permissions for the electronic form, wherein the electronic form developer publishes the finalized electronic form and enables an authorized electronic form users to access the electronic form; and
converting entered data from the authorized electronic form user into a data storage format, and exporting the dara storage format to a file having another data presentation format.

2. The non-transitory computer-readable storage medium of claim 1, wherein the electronic form developer sets control attributes of the electronic application corresponding to the electronic form object, the control attributes comprising at least one of: Element Type, Size, Maximum Length, Default Value, and Data Format.

3. The non-transitory computer-readable storage medium of claim 1, further comprising providing a preview mode for the electronic form developer to preview the electronic form.

4. The non-transitory computer-readable storage medium of claim 1, further comprising adding first default data associated with the specific field and stores a first correlation between the specific field and the first default data in the common library.

5. The non-transitory computer-readable storage medium of claim 1, wherein the electronic form developer selects specific default data from the common library and binds the specific default data with the specific field.

6. The non-transitory computer-readable storage medium of claim 1, wherein the electronic form developer of another electronic form selects specific default data from the common library and binds the specific default data with another specific field in the other electronic form.

7. The non-transitory computer-readable storage medium of claim 1, further comprising enabling the electronic form developer to set at least one of the following for the electronic form: approval level, approval workflow, and permission rules.

8. A form management method, comprising:
calling, by one or more processors, a word processing application software to obtain layout information of a electronic form;
building, by the one or more processors, a correlation between a specific field of the electronic form and default data of the specific field and storing the correlation in a common library, wherein an electronic form developer sets a element type for the specific field, and when the element type for the specific field is set, existing default data associated with the specific field in the common library is searched and displayed in a development interface to the electronic form developer;
converting, by the one or more processors, the layout information of a paper form into the electronic form, wherein the electronic form is a form in an electronic application;
setting, by the one or more processors, required fields of the electronic form and an electronic form object corresponding to each required field via a data-bound control of the word processing application software;
setting, by the one or more processors, access permissions for the electronic form;
enabling, by the one or more processors, an electronic form developer to publish the finalized electronic form;
enabling, by the one or more processors, an authorized user to access the electronic form;
converting, by the one or more processors, entered data from the authorized user into a data storage format; and
exporting, by the one or more processors, the data storage format to a file having another data presentation format.

9. The form management method of claim 8, wherein the electronic form developer sets control attributes of the electronic application corresponding to the electronic form object, the control attributes comprising at least one of: element type, size, maximum length, default value, and data format.

10. The form management method of claim 8, further comprising providing, by the one or more processors, a preview mode for the electronic form developer to preview the electronic form.

11. The form management method of claim 8, further comprising adding, by the one or more processors, first default data associated with the specific field and storing a first correlation between the specific field and the first default data in the common library.

12. The form management method of claim 8, wherein the electronic form developer selects specific default data from the common library and binds the specific default data with the specific field.

13. The form management method of claim 8, wherein the electronic form developer of another electronic form selects specific default data from the common library and binds the specific default data with another specific field in the other electronic form.

14. The form management method of claim 8, further comprising setting, by the one or more processors, at least one of the following for the electronic form: approval level, approval workflow, and permission rules.

* * * * *